United States Patent [19]

Burkhardt et al.

[11] 4,203,913
[45] May 20, 1980

[54] STABILIZATION OF ORGANOPOLYSILOXANES

[75] Inventors: Jurgen Burkhardt, Halsbach; Karl-Heinrich Wegehaupt, Burghausen, both of Fed. Rep. of Germany

[73] Assignee: Wacker-Chemie GmbH, Munich, Fed. Rep. of Germany

[21] Appl. No.: 687,064

[22] Filed: May 17, 1976

[30] Foreign Application Priority Data

May 30, 1975 [DE] Fed. Rep. of Germany ....... 2524041

[51] Int. Cl.² .............................................. C07F 7/04
[52] U.S. Cl. .................................. 556/401; 556/410; 556/417; 556/446; 556/451; 556/456; 556/463; 556/454
[58] Field of Search .................................. 260/448.2 S

[56] References Cited

U.S. PATENT DOCUMENTS

| 2,389,802 | 11/1945 | McGregor et al. | 260/448.2 S X |
| 2,389,803 | 11/1945 | McGregor et al. | 260/448.2 S X |
| 2,389,805 | 11/1945 | McGregor et al. | 260/448.2 S X |
| 2,389,807 | 11/1945 | McGregor et al. | 260/448.2 S X |
| 3,019,191 | 1/1962 | Furby et al. | 260/448.2 S X |
| 3,057,821 | 10/1962 | Boot | 260/448.2 S X |
| 3,078,229 | 2/1963 | Cox | 260/448.2 S X |

Primary Examiner—Paul F. Shaver

[57] ABSTRACT

A method for stabilizing organopolysiloxanes which are obtained from the condensation and/or equilibration of organosilicon compounds in the presence of phosphoronitrile chlorides which comprises treating the organopolysiloxanes with ammonia or an amine of the general formula $$YHNC(CH_3)_n(CH_2X)_{3-n}$$

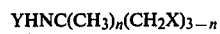

in which each X represents a hydrogen atom or a radical of the formulae $-OCH_3$, $-N(CH_3)_2$, $-C(CH_3)_3$, $-C(CH_3)_2NHY$ and $-OC(CH_3)_3$; Y represents a hydrogen atom or a trimethylsilyl radical and n represents 0, 1, 2 or 3.

14 Claims, No Drawings

STABILIZATION OF ORGANOPOLYSILOXANES

The present invention relates to the stabilization of organopolysiloxanes and more particularly to a method for stabilizing organopolysiloxanes which are prepared in the presence of phosphoronitrile chlorides.

One method for preparing organopolysiloxanes is by the condensation and/or equilibration of organosilicon compounds containing silicon-bonded oxygen atoms in the presence of phosphoronitrile chlorides. The organopolysiloxanes prepared in this manner contain phosphoronitrile chlorides and/or reaction products thereof, the presence of which can render the organopolysiloxanes, especially the viscosity, unstable. In other words, even after termination of the polymerization, the presence of these phosphorus compounds in the organopolysiloxanes can cause the polymerization to "coast", thereby resulting in an instability in the viscosity of the organopolysiloxanes during storage.

Removal of the phosphorus compounds from the organopolysiloxanes has been attempted but their complete removal has proven difficult, if not almost impossible.

The viscosity of the organopolysiloxanes containing the phosphorus compounds can be stabilized by treating them with tertiary amines (cf. U.S. Pat. Nos. 3,398,176 and 3,839,388). However, it has been found that organopolysiloxanes so treated have a tendency to become discolored, i.e., they first turn yellow and then brown, when heated to temperatures above 150° C.

Therefore it is an object of this invention to stabilize organopolysiloxanes. Another object of this invention is to provide a method for stabilizing organopolysiloxanes which are prepared using phosphoronitrile chlorides as catalysts. A further object of this invention is to provide a method for stabilizing organopolysiloxanes to prevent discoloration when these organopolysiloxanes are heated to temperatures above about 150° C.

The foregoing objects and others which will become apparent from the following description are accomplished in accordance with this invention, generally speaking, by providing a method for stabilizing the viscosity of organopolysiloxanes prepared from phosphoronitrile chlorides which comprises treating the organopolysiloxanes with ammonia or an amine of the general formula $$YHNC(CH_3)_n(CH_2X)_{3-n}$$

in which each X represents a hydrogen atom or a radical of one of the formulae $—OCH_3$, $—N(CH_3)_2$, $—C(CH_3)_3$, $—C(CH_3)_2NHY$ and $—OC(CH_3)_3$; each Y represents a hydrogen atom or a trimethylsilyl radical, and n represents 0, 1, 2 or 3, in which ammonia or the amine is present in an amount of from 1 to 5 moles per mole of phosphoronitrile chloride (calculated as $PNCl_2$) used in the preparation of the organopolysiloxanes.

It has been found that organopolysiloxanes treated in accordance with this invention remain substantially colorless even at temperatures of 150° C. and more.

Organopolysiloxanes which may be treated in accordance with this invention are those preferably having the general formula

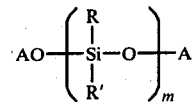

in which R represents an unsubstituted or substituted monovalent hydrocarbon radical, R' represents a hydrogen atom or an unsubstituted or substituted monovalent hydrocarbon radical, A represents a hydrogen atom or a radical of the formula $—SiR''_3$, in which R'' represents an unsubstituted or substituted monovalent hydrocarbon or a hydrocarbonoxy radical, and m represents an integer of at least 50.

The organopolysiloxanes represented by the general formula above may also contain up to 5 mole percent of siloxane units other than the diorganosiloxane units and monoorganohydrogensiloxane units. Such other units are, for example, $RSiO_{3/2}$ and $SiO_{4/2}$ units. Generally they are present only as impurities and their presence often cannot be avoided.

Unsubstituted monovalent hydrocarbon radicals represented by R, R' and R'' are, for example, alkyl radicals, e.g., methyl, ethyl, n-propyl, isopropyl, n-butyl and sec-butyl radicals; alkenyl radicals, e.g., vinyl and allyl radicals; and aryl radicals, e.g., phenyl radicals. Suitable substituted monovalent hydrocarbon radicals denoted by R, R' and R'' are, for example, cyanoalkyl radicals, e.g., beta-cyanoethyl radicals, haloalkyl radicals, e.g., 3,3,3-trifluoropropyl radicals, and haloaryl radicals, e.g., o—, m— and p-chlorophenyl radicals. Examples of substituted and unsubstituted hydrocarbonoxy radicals represented by R'' are methoxy, ethoxy and 2-methoxyethoxy radicals.

Organopolysiloxanes in which at least 50 percent of the total number of atoms and radicals represented by R and R' are methyl radicals are preferred, because they are more readily available. Any remaining organic radicals represented by R or R' are preferably vinyl or phenyl radicals.

This invention is especially applicable to organopolysiloxanes of the above formula in which A represents a hydrogen atom or a radical of the formula $—SiR''_3$.

The organopolysiloxanes preferably have a viscosity within the range of from $10^3$ to $5 \times 10^7$ cP at 25° C.

A mixture of two or more organopolysiloxanes may be treated in accordance with the method of this invention.

Phosphoronitirle chlorides which may be used in the preparation of organopolysiloxanes may be prepared by the reaction of phosphorus pentachloride with ammonium chloride in a weight ratio of 4:1.3 (cf. Berichte der deutschen Chemischen Gesellschaft. Vol. 57 (1924) p. 1345). An alternative, and preferred, method for their preparation is by the reaction of phosphorus pentachloride and ammonium chloride in a molar ratio of 2:1 (cf. U.S. Pat. No. 3,839,388).

The term "phosphoronitrile chloride" as used herein includes not only the simplest phosphoronitrile chloride ($PNCl_2$), but also includes complex phosphoronitrile chlorides, for example, those described in U.S. Pat. No. 3,839,388 which have the formula $Cl_3PNPCl_2NPCl_3·PCl_6$.

The nature of the phosphorus compounds present in the organopolysiloxanes prepared by the condensation and/or equilbration of organosilicon compounds containing silicon-bonded oxygen atoms in the presence of phosphoronitrile chlorides, cannot readily be ascertained. These phosphorus compounds may be phosphoronitrile chlorides or they may be reaction products thereof or they may consist of a mixture of the two. For this reason, the expression "organopolysiloxanes prepared using phosphoronitrile chlorides" has been used herein and is to be understood accordingly.

The preparation of organopolysiloxanes by the condensation and/or equilibration of organosilicon compounds containing silicon-bonded oxygen atoms in the presence of phosphoronitrile chlorides has been described in, for example, U.S. Pat. Nos. 2,830,967, 2,990,419, 3,186,967, 3,398,176, 3,652,711, 3,706,775 and 3,839,388, Canadian Pat. No. 809,229 and British Pat. No. 1,049,188.

Organsilicon compounds containing silicon-bonded oxygen atoms which may be used for this purpose are preferably organopolysiloxanes of the general formula

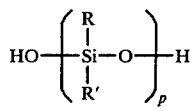

in which R and R' are the same as defined above and p represents an integer from 1 to 1000, optionally in admixture with triorganosiloxy-terminated organopolysiloxanes of the genral formula

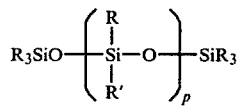

in which R, R' and p are the same as defined above, or with another organosilicon compound that will form triorganosiloxy groups.

In the preparation of the organopolysiloxanes, the phosphoronitrile chlorides are generally used in an amount of from 0.001 to 0.1 percent by weight, preferably from 0.003 to 0.05 percent by weight, based on the weight of the organosilicon compounds.

The compounds used according to this invention for stabilizing the organopolysiloxanes are basic nitrogen compounds. They include ammonia and certain amines having at least one hydrogen atom bonded to the nitrogen atom, and are defined by the general formula illustrated above. Examples of suitable amine compounds are:
t-butylamine $(CH_3)_3CNH_2$,
N-trimethylsilyl-t-butylamine $(CH_3)_3SiNHC(CH_3)_3$,
t-octylamine $(CH_3)_3CCH_2C(CH_3)_2NH_2$,
N-trimethylsilyl-t-octylamine
  $(CH_3)_3SiNHC(CH_3)_2CH_2C(CH_3)_3$,
2,2,4,6,6-pentamethylheptylamine-4
  $[(CH_3)_3CCH_2]CCH_3NH_2$,
2-amino-2-methyl-1-methoxy-propane
  $CH_3OCH_2C(CH_3)_2NH_2$,
2,4-diamino-2,4-dimethyl-pentane,
  $[H_2NC(CH_3)_2]_2CH_2$.
Mixtures of two or more amines may be used.

Generally, it is preferred that the amine be added to the organopolysiloxanes in the form of a solution, since this enhances the uniform distribution of the amine in the organopolysiloxanes. A suitable solvent for the amine is one that is inert under the conditions of treatment, and in particular one that is not oxidatively dehydratable. Examples of suitable solvents are water; alcohols, e.g., t-butanol and t-octanol; hydrocarbons, e.g., 2,2,4,4-tetra-methylpentane, benzene, toluene, and xylenes; halohydrocarbons, e.g., methylene chloride, perchloroethylene and chlorobenzene; ethers, e.g., di-t-butyl ether and ketones, e.g., di-t-butyl ketone. It is preferred that the amine be present in the solution in an amount of from 1 to 60 percent by weight based on the weight of the amine and solvent.

When ammonia is used as the basic nitrogen compound, it may be used in the form of a solution as described above, or in gaseous form, or in a solution in admixture with an amine, or it may be generated in-situ. If the method of this invention is carried out at a temperature exceeding 150° C., ammonia may be generated in-situ, for example, by splitting urea dissolved in, for example, formamide.

The method of this invention is preferably carried out at a temperature of from 0° to 200° C., and more preferably from 100° to 180° C. It is most conveniently carried out under atmospheric pressure, but may be carried out under higher or lower pressures. It may be carried out batch-wise, semicontinuously or continuously.

The organopolysiloxanes are preferably mixed with the basic nitrogen compounds in, for example, a planetary mixer, a twin-screw kneader, or a gear pump.

The following examples illustrate this invention and the results obtained from these examples are compared with organopolysiloxanes which have been treated with tertiary amines in accordance with the prior art described above.

All parts and percentages given in the examples are by weight unless otherwise specified. All viscosities are measured at 25° C.

The phosphoronitrile chloride used in the examples was prepared in the following manner: A mixture containing 417 parts (2 moles) of phosphorus pentachloride and 53.5 parts (1 mole) of ammonium chloride in 1000 parts by volume of tetrachloroethane was refluxed over an oil bath having a temperature of 160° C. to give a bright yellow solution. After distilling off the solvent, the volatile components were removed at 160° C. under a pressure of about 1 torr to yield a residue of yellowish crystals consisting primarily of a phosphoronitrile chloride having the formula

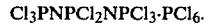

$Cl_3PNPCl_2NPCl_3·PCl_6$.

EXAMPLE 1

(a) A mixture containing 4000 parts of hydroxysiloxy-terminated dimethylpolysiloxane having a viscosity of 180 cSt, 70 parts of a trimethysiloxy-terminated dimethylpolysiloxane having a viscosity of 130 cSt, and 1 part by volume of a 25 percent solution of phosphoronitrile chloride in methylene chloride was heated in a kneader under a pressure of 10 torr and at a temperature of 80° C., until a trimethylsiloxy-terminated dimethylpolysiloxane having a plasticity value of 540 mkp had been formed.

(b) About 0.4 parts by volume of a 25 percent solution in methylene chloride of each of the amines listed in Table 1 was kneaded at room temperature and at atmospheric pressure, into the respective samples, each containing 400 parts of the highly vicous dimethylpolysiloxane prepared in Example 1(a) above. The mixtures thus obtained were colorless, and no change in their respective viscosities were detected over a period of six months. Samples of each of these mixtures were heated at a temperature of 200° C. in a drying oven for 16 hours. The following results were obtained:

Table 1

| Amine | Appearance of the polysiloxane after heating |
|---|---|
| t-butylamine | colorless, clear |
| N-trimethylsilyl-t-butylamine | colorless, clear |
| t-octylamine | colorless, clear |
| N-trimethylsilyl-t-octylamine | colorless, clear |
| tri-n-butylamine* | brown, cloudy |
| tri-n-propylamine* | brown |
| triethylamine* | yellowish-brown |
| diethylbenzylamine* | greyish-brown, cloudy |
| diethylisopentylamine* | brown |
| dimethyllaurylamine* | yellowish-brown |

*Comparison example

EXAMPLE 2

(a) About 100 liters per hour of a hydroxysiloxy-terminated dimethylpolysiloxane having a viscosity of 104 cSt., 1.2 liters per hour of a trimethylsiloxy-terminated dimethylpolysiloxane having a viscosity of 135 cSt, and 140 milliliters per hour of a 2.5 percent solution of phosphoronitrile chloride in methylene chloride were fed continuously into a twin-screw kneader having a 140 cm-long reaction zone and operated at 150° C. and 5 torr. A trimethylsiloxy-terminated dimethylpolysiloxane having a plasticity value of 520 mkp was produced and passed via a discharge screw into a discharge pipe.

(b) While still hot (about 150° C.), samples of the highly viscous trimethylsiloxy-terminated dimethylpolysiloxane discharged from the discharge pipe were respectively mixed by means of a gear pump, with 140 milliliters per hour of a 5 percent solution in methylene chloride of each of the amines listed in Table 2. One sample from each mixture was cooled to 20° C. and a second sample was heated at 200° C. in a drying oven for 16 hours. The following results were obtained:

Table 2

| Amine | Appearance of the polysiloxane after cooling | Appearance of the polysiloxane after heating |
|---|---|---|
| t-octylamine | colorless, clear | colorless, clear |
| N-trimethylsilyl-t-butylamine | colorless, clear | colorless, clear |
| dimethyl coconut oil amine* | yellow, cloudy | brown, cloudy |
| triisopentylamine* | yellow, cloudy | brown, cloudy |

*Comparison example

EXAMPLE 3

(a) 100 liters per hour of a hydroxysiloxy-terminated dimethylpolysiloxane having a viscosity of 95 cSt and 70 milliliters per hour of a 2.5 percent solution of phosphoronitrile chloride in methylene chloride were fed continuously into a twin-screw kneader having a 140 cm-long reaction zone and operated at 150° C., and 5 torr. A hydroxysiloxy-terminated dimethylpolysiloxane having a plasticity value of 580 mkp was produced and passed via a discharge screw into a discharge pipe.

(b) About 400 milliliters per hour (calculated at normal pressure) of gaseous ammonia were introduced into the discharge pipe and mixed with the highly viscous dimethylpolysiloxane, by means of a gear pump fitted to the discharge pipe. Samples of this mixture were heated at 200° C. in a drying oven for 16 hours. All the samples remained clear and colorless.

No change in viscosity could be detected over a period of six months in any of the mixtures containing the organopolysiloxanes and amines prepared in Examples 1 to 3.

Although specific examples of the invention have been described herein, other variations and modifications falling within the spirit and scope of the appended claims are to be included therein.

What is claimed is:

1. A method for stabilizing the viscosity of organopolysiloxanes prepared in the presence of phosphoronitrile chlorides, which comprises treating the organopolysiloxane with a basic nitrogen compound selected from the class consisting of ammonia, an amine of the general formula $$YHNC(CH_3)_n(CH_2X)_{3-n}$$

and mixtures thereof in which X is selected from the class consisting of a radical of the formulae —OCH$_3$, —N(CH$_3$)$_2$, —C(CH$_3$)$_3$, —C(CH$_3$)$_2$NHY and —OC(CH$_3$)$_3$ and a hydrogen atom, Y is selected from the class consisting of hydrogen and a trimethylsilyl radical, and n represents 0, 1, 2, or 3, in which the amount of basic nitrogen compound is from 1 to 5 moles per mole of phosphoronitrile chloride calculated as PNCl$_2$ used in the preparation of the organopolysiloxane.

2. The method of claim 1, wherein the organopolysiloxane is represented by the general formula

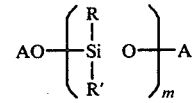

in which R is selected from the class consisting of an unsubstituted and a substituted monovalent hydrocarbon radical, R' is selected from the class consisting of a hydrogen atom, an unsubstituted and a substituted monovalent hydrocarbon radical; A is selected from the group consisting of a hydrogen atom and a radical of the formula —SiR"$_3$ in which R" is selected from the class consisting of an unsubstituted monovalent hydrocarbon radical, a substituted monovalent hydrocarbon radical and a hydrocarbonoxy radical, and m represents an integer of at least 50.

3. The method of claim 2, wherein at least 50 percent of the total number of atoms and radicals represented by R and R' are methyl radicals and any remaining organic radicals represented by R and R' are selected from the class consisting of vinyl and phenyl radicals.

4. The method of claim 1, wherein the organopolysiloxane has a viscosity of from $10^3$ to $5 \times 10^7$ cP at 25° C.

5. The method of claim 1, wherein the phosphoronitrile chloride is obtained from the reaction of phosphorus pentachloride and ammonium chloride in a molar ratio of 2:1.

6. The method of claim 1, wherein the phosphoronitrile chloride has the general formula $$Cl_3 PNPCl_2NPCl_3 \cdot PCl_6.$$

7. The method of claim 1, wherein the amine is selected from the class consisting of t-butylamine, N-trimethylsilyl-t-butylamine, t-octylamine, N-trimethylsilyl-t-octylamine, 2,2,4,6,6-penta-methylheptylamine-4,2-amino-2-methyl-1-methoxy-propane, and 2,4-diamino-2,4-dimethyl-pentane.

8. The method of claim 1, wherein an amine solution is used to treat the organopolysiloxane.

9. The method of claim 8, wherein the amine is dissolved in a solvent selected from the class consisting of water, an alcohol, a hydrocarbon, a halohydrocarbon, an ether and a ketone.

10. The method of claim 8, wherein the solution contains from 1 to 60 percent by weight of amine, based on the weight of the amine and solvent.

11. The method of claim 1, wherein the basic nitrogen compound is ammonia which is generated in-situ.

12. The method of claim 1, wherein the organopolysiloxane is treated with the basic nitrogen compound at a temperature of from 0° to 200° C.

13. The method of claim 1, wherein the organopolysiloxane is treated with the basic nitrogen compound at a temperature of from 100° to 180° C.

14. An organopolysiloxane treated in accordance with the method of claim 1.

* * * * *